United States Patent Office 2,765,586
Patented Oct. 9, 1956

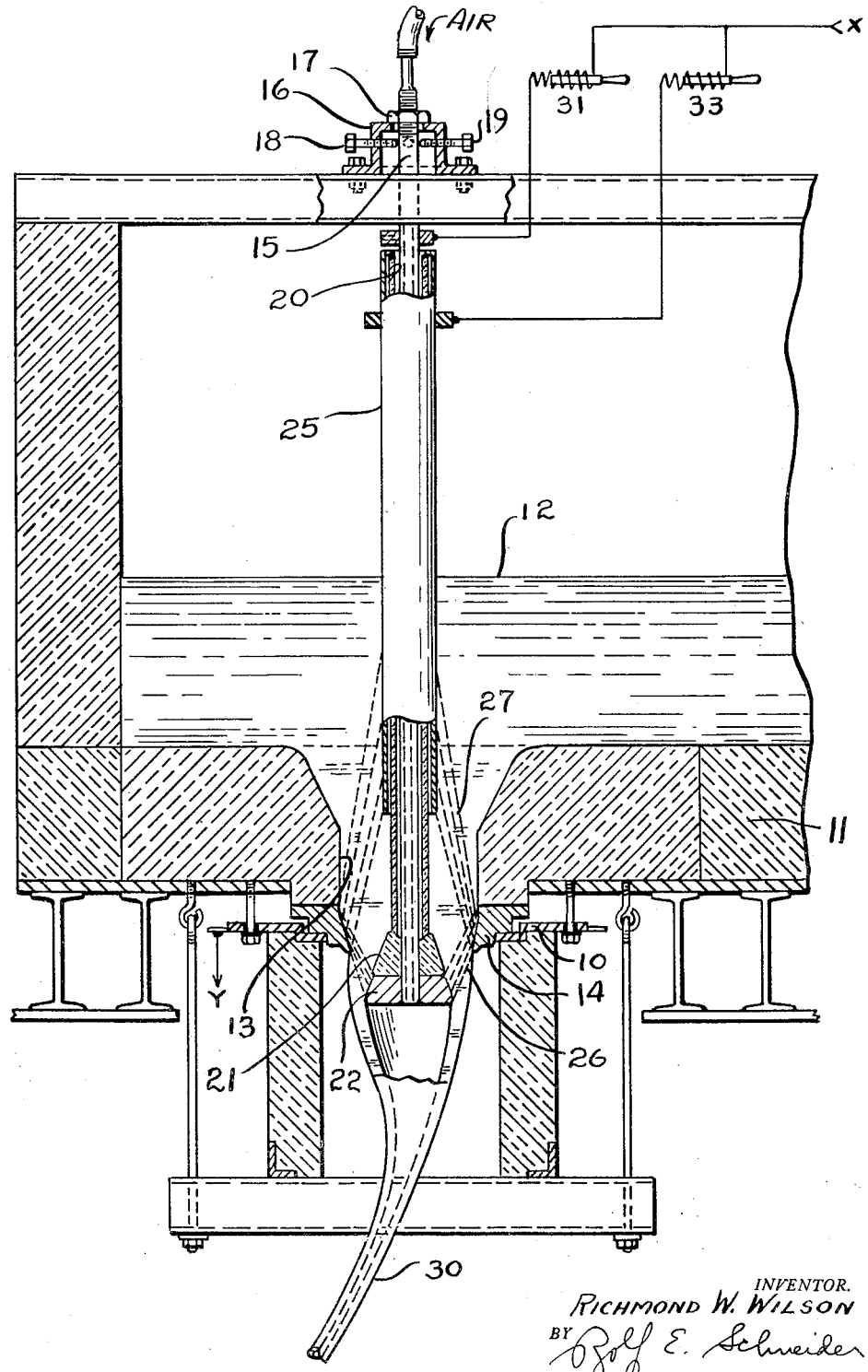

2,765,586

MANUFACTURE OF GLASS TUBING

Richmond W. Wilson, Corning, N. Y., assignor to Corning Glass Works, Corning, N. Y., a corporation of New York Application October 23, 1952, Serial No. 316,406

4 Claims. (Cl. 49—17.1)

The present invention relates to the continuous drawing of glass tubing from a bottom outlet in a container for molten glass. More particularly the present invention relates to improvements in systems of the general type disclosed in Sanchez-Vello Patent No. 2,009,793 wherein the glass issuing from such an outlet passes over a bore-forming tool or bell arranged partly within and terminating slightly below the outlet and supported on a tubular mandrel extending above and substantially coaxial with such outlet.

One of the operating difficulties of such systems is the maintenance of the temperature of the leaving edge of the ring bordering the bottom outlet and the leaving surface of the bore-forming tool high enough to prevent the formation of crystals thereon so that the quality of the resulting tubing is not impaired by the periodic release of such crystals thereinto.

A method generally employed in the past to prevent such crystal formations has been to direct combustion flames toward such surfaces from a source below the outlet. Heating of the ring in this fashion tends to result in excessive heating of the glass between the ring and the bore-forming tool, however, and is objectionable in that it thus becomes difficult to maintain size control of the tubing being formed.

In this manner of heating, moreover, it is also difficult to uniformly heat the glass between the ring and the tool with the result that so called "siding" or variation in wall thickness of the tubing occurs. Correction for this condition usually involves adjustment of certain of the combustion flames and/or lateral shifting of the mandrel. Excessive heating of the glass in the maintenance of size control can only be prevented, on the other hand, by reducing the flame intensity so that, at best, a compromise must be made.

The prime object of the present invention is the provision of an improved arrangement for maintaining the bore-forming tool and the orifice ring above the temperature at which crystals will be formed thereon without objectionably heating the issuing glass.

Another object of the invention is the provision of facilities for imparting heat to the tool and to the ring in such a fashion that the likelihood of "siding" developing is reduced to a minimum.

A further object of the invention is the provision of facilities for the separate introduction of highly localized heat into the ring and the tool, thereby facilitating greater flexibility in their temperature control, particularly of the tool, as found advantageous in the selective production of tubing of different wall thicknesses.

According to the invention separately controlled electric heating circuit paths are produced through the molten glass as it is being drawn off in tubular form over the bore-forming tool. One such circuit path extends from an electrode, advantageously a tubular electrode or sleeve surrounding the mandrel, positioned well above the orifice ring and passes longitudinally and diagonally from the bore of the tubular glass stream to the outer surface thereof and to the inner perimeter of the ring which is thus employed as an electrode. The other heating path is from the ring and the outer surface of the glass stream longitudinally and diagonally through the stream to the leaving edge or outer perimeter of the tool which is thus also employed as an electrode.

A particular feature of the present invention is the production of such current flow paths through the glass stream essentially longitudinally of lengthwise tubular sections thereof as such stream is being issued rather than transversely therethrough so that, if necessary, lateral shifting of the mandrel to correct for "siding" can be effected without causing an appreciable change in the current density through the glass between the bore-forming tool and any particular oppositely disposed portion of the ring. Obviously any such change in current density would tend to effect uneven heating of the glass and interfere with the steps taken in an attempt to correct for "siding."

The accompanying drawing shows, by way of example, a sectional elevation of a furnace forehearth containing molten glass, and equipped in accordance with the invention for the delivery of glass in tubular form from the bottom outlet thereof.

Referring to the drawing in detail, the structure shown includes a forehearth 11 containing a supply body of molten glass 12 maintained therein by a suitable glass-melting tank (not shown) with which the forehearth is associated in conventional fashion. The forehearth 11 has the usual glass-feeding bottom outlet 13 whose leaving edge is provided with a metal orifice ring 14 held in place by a suitable ring support 10.

An electrical conductor comprising a hollow metal mandrel 15 in vertical register with the bore of ring 14 depends from a suitable frame 16 arranged over the forehearth 11 and is of such length that its lower end terminates somewhat below such ring. The mandrel 15 at its upper end passes through a suitable aperture in frame 16 and is screw-threaded through a mandrel height-adjusting nut 17 resting on top of the frame. A number of screws such as 18 and 19 surrounding the mandrel are screw-threaded through frame 16 and provide for lateral adjustment of the mandrel in an obvious fashion.

The mandrel 15 for the greater part of its length is surrounded by a dielectric refractory tube 20 which at its bottom end fits against the dielectric refractory section 21 of a bore-forming tool or bell that includes a bottom section 22 of highly refractory metal fixed to the mandrel. The tube 20 is in turn surrounded by an electrode comprising a metal sleeve 25 that extends from the top of tube 20 down into the molten glass 12 and terminates well above ring 14.

Tubing 30 may be drawn in the customary fashion from the supply body of glass 12 within the forehearth 11 through the annular space between the ring 14 bordering the bottom outlet 13 and the dielectric and metal bell sections 21 and 22, while bore-maintaining air is supplied to the tubing through the hollow mandrel.

During the tube-drawing operation electric current is conveniently supplied from one terminal X of a suitable current supply source, through a suitable current-regulating device such as the direct current saturable core reactor 31, to the mandrel 15 and the bottom section 22 of the bell and then diagonally outwardly but in a generally lengthwise direction through the surrounding tubular stream of glass along paths such as indicated by interrupted lines 26 to the surrounding orifice ring 14 and the ring support 10 to the terminal Y of the same current source. At the same time current is caused to flow from terminal X of such current source through a similar reactor 33 to the sleeve 25 and from the lower end thereof diagonally outwardly but in a generally lengthwise direction through the tubular stream of glass along paths such as indicated by the interrupted lines 27 to the orifice ring 14 and the terminal Y of such current source.

As will be appreciated, by the employment of the ring 14 as the common terminal of the two current flow paths, sufficient heat can readily be generated in ring 14 to maintain it above the crystallization temperature of the engaged glass as it passes therethrough. Obviously, since the tool or bell section 22 is entirely encased in glass, the current passing therethrough readily suffices to maintain it will above the crystallization temperature of the glass. Furthermore the heat introduced into the tool may be separately regulated to advantage for control of the wall thickness of the glass tubing being drawn thereover.

As hereinbefore pointed out, since the current flow paths are essentially lengthwise of the stream, should "siding" occur, appropriate lateral adjustment of the mandrel can be made and the condition thus corrected without materially modifying the lengths of the described current flow paths through the glass.

I claim:

1. In combination, a container for molten glass provided with a bottom outlet, an electrically conductive ring bordering the leaving side of said outlet, a bore former having its tip composed of electrically conductive material, said former being arranged coaxially within said ring with its tip below said ring, said former restricting the passage of glass through said ring to an annular path so that glass issues from the outlet in tubular form, an electrode adapted to be submerged in molten glass in the container and terminating in the vicinity of the entering edge of the outlet so that it is closer to said ring than to the tip of said former, an electrical connection extending from said electrode to one terminal of an electric current supply source, an electrical connection between such terminal and the tip of said former including a support for said former, means electrically insulating said support from the submerged electrode, and an electrical connection between said ring and the opposite terminal of said current supply source whereby separate heating paths are provided through the glass between said electrode and said ring and between said former tip and said ring.

2. Apparatus for forming hollow glassware comprising a container having a ring of metal defining a bottom outlet thereof, a metal tipped former centrally positioned with respect to the container outlet and located partly within said ring so that an annular passage remains within the confines of the ring for the issuance of molten glass in tubular form from such container, a support for said former adapted to pass through the body of molten glass within such container, an electrode surrounding said support and extending below the normal glass line in said container, separate electrical connections extending from said electrode and the metal tip of said former respectively to one terminal of an electric current supply source, an electrical connection extending from said ring to the opposite terminal of said source, and a tube of refractory electrical insulation surrounding said support electrically insulating it from said electrode and from the glass within said container.

3. In a tube-drawing machine, a container having a submerged orifice ring of electrically conducting material, a cylindrical electrode arranged coaxially with respect to the orifice ring, said electrode being adapted to project down into the molten glass within the container and terminating above the orifice ring, a mandrel passing through the bore of said electrode and projecting through the orifice ring, said mandrel having at its lower end an electrically conductive bore-forming tool, and means for independently establishing electric current flow paths in the glass between said electrode and said ring and between said bore-forming tool and said ring respectively, said means including a tube of refractory material surrounding said mandrel and shielding it from contact with the glass within the container.

4. Apparatus such as defined by claim 2 wherein the respective electrical connections to such one terminal include separate current-regulating devices.

References Cited in the file of this patent

UNITED STATES PATENTS

| | | |
|---|---|---|
| 469,454 | Rogers | Feb. 23, 1892 |
| 848,422 | Wynne | Mar. 26, 1907 |
| 1,975,737 | Sanchez-Vello | Oct. 2, 1934 |
| 2,186,718 | Ferguson | Jan. 1, 1940 |
| 2,215,982 | Slayter et al. | Sept. 24, 1940 |
| 2,429,220 | Danner | Oct. 21, 1947 |

FOREIGN PATENTS

| | | |
|---|---|---|
| 543,172 | Great Britain | Feb. 12, 1942 |